(12) United States Patent
Wang et al.

(10) Patent No.: US 11,767,605 B1
(45) Date of Patent: Sep. 26, 2023

(54) PREPARATION METHOD OF GRADIENT HIGH-SILICON STEEL BY MOLTEN SALT ELECTROLYSIS

(71) Applicant: UNIVERSITY OF SCIENCE AND TECHNOLOGY BEIJING, Beijing (CN)

(72) Inventors: Zhe Wang, Beijing (CN); Shuqiang Jiao, Beijing (CN); Zheng Huang, Beijing (CN); Xinrui Wang, Beijing (CN)

( * ) Notice: Subject to any disclaimer, the term of this patent is extended or adjusted under 35 U.S.C. 154(b) by 0 days.

(21) Appl. No.: 18/331,675

(22) Filed: Jun. 8, 2023

(30) Foreign Application Priority Data

Feb. 27, 2023 (CN) .......................... 202310166122.7

(51) Int. Cl.
| | |
|---|---|
| C25C 7/06 | (2006.01) |
| C25C 3/36 | (2006.01) |
| C21D 1/84 | (2006.01) |
| C21D 1/74 | (2006.01) |
| C21D 9/46 | (2006.01) |
| C21D 6/00 | (2006.01) |
| C22C 38/14 | (2006.01) |
| C22C 38/12 | (2006.01) |
| C22C 38/06 | (2006.01) |
| C22C 38/04 | (2006.01) |
| C22C 38/02 | (2006.01) |

(Continued)

(52) U.S. Cl.
CPC .................. *C25C 7/06* (2013.01); *C21D 1/74* (2013.01); *C21D 1/84* (2013.01); *C21D 6/005* (2013.01); *C21D 6/008* (2013.01); *C21D 9/46* (2013.01); *C22C 38/001* (2013.01); *C22C 38/002* (2013.01); *C22C 38/004* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C25C 3/36* (2013.01); *C25C 7/02* (2013.01); *C22C 2202/02* (2013.01)

(58) Field of Classification Search
None
See application file for complete search history.

(56) References Cited

FOREIGN PATENT DOCUMENTS

CN          110042297 A  *  7/2019  ............ C22C 33/06

OTHER PUBLICATIONS

English language machine translation of CN-110042297-A. Generated Jul. 28, 2023. (Year: 2023).*

(Continued)

*Primary Examiner* — Brian D Walck

(57) ABSTRACT

A preparation method of gradient high-silicon steel by molten salt electrolysis includes: weighing the inorganic fluoride salt and the inorganic silicon salt, mixing them uniformly and then drying; heating the electrolysis container over the melting point of the electrolyte, passing the inert gas through the electrolysis container, and connecting the electrode to the power supply to perform constant current electrolysis, after the electrolysis is finished, the cathode is taken out, washed and dried, placing the dried cathode in a constant temperature region of an annealing furnace; under a protective gas atmosphere, heating the cathode to the target temperature, and maintaining the temperature for a period of time; after the heat treatment, cooling the cathode to the room temperature, during which the cathode is always placed in the furnace.

7 Claims, 2 Drawing Sheets

(51) Int. Cl.
    *C22C 38/00*       (2006.01)
    *C25C 7/02*        (2006.01)

(56) References Cited

OTHER PUBLICATIONS

Cai Zong-ying, et al., "Preparation of Fe—6.5%Si Sheet by Electrochemical Reduction", Hydrometallurgy of China, Jun. 2005, vol. 2, 83-87.
Li Hui, et al., "Effect of Annealing Conditions on Microstructure of High Silicon Steel Prepared by Electrodeposition", Chinese Journal of Materials Research, Jul. 2014, vol. 7, 549-554.

* cited by examiner

PREPARATION METHOD OF GRADIENT HIGH-SILICON STEEL BY MOLTEN SALT ELECTROLYSIS

FIELD OF THE DISCLOSURE

The present invention belongs to the field of metal material synthesis and processing, and relates to a process technology for preparing a gradient silicon steel.

BACKGROUND OF THE DISCLOSURE

High-silicon steel generally refers to a ferrosilicon with the Si content of 4.5-6.7 wt %, which is mainly used in magnetic parts of generator, a transformer and an automobile boost converter. The magnetic properties of silicon steel with different Si content are different. With the increase of Si content, the resistivity and permeability increase, the magnetostriction coefficient and iron loss decrease. When the Si content reaches 6.5 wt %, the permeability reaches the maximum, the magnetostriction coefficient is approximately zero, the iron loss is the lowest, and the magnetic performance is the best. However, with the increase of Si content, the hardness and brittleness of high-silicon steel increase sharply, the toughness and elongation decrease sharply, and the machining property is poor. It is difficult to produce 6.5 wt % Si silicon steel on a large scale by the traditional rolling method, which restricts the development and application of high-silicon steel.

In order to overcome the problem that it is difficult to process the high-silicon steel due to brittleness, the development of new preparation technology has been continuously attempted, but there are some problems causing difficulty to practical application. At present, only the chemical vapor deposition (CVD) has realized the small-batch industrial production of 6.5 wt % silicon steel. However, this process has the disadvantages of excessive Fe-based loss, environmental pollution and high equipment maintenance costs. In the molten salt electrolysis technology, there are few electrolysis side reactions. Also, the deposition speed is fast, the deposition layer is thick and uniform, and the microstructure of the product is controllable, which can realize the production of high-silicon steel.

In a preparation method for gradient silicon steel invented by Li Hui et al. With the SiO2S as electrolyte, low silicon steel and graphite are used as a cathode and an anode respectively for electrolysis, and the particles on the surface of the deposition layer are fine and have good density. However, high current density easily leads to anode passivation, which affects the quality of deposition products. The molten salt electrolyte used in the electrolysis system cannot be recycled, which results in waste of silicon-based materials and environmental pollution caused by fluoride salts. In A preparation method of gradient silicon steel by electrolysis-diffusion at normal temperature invented by Sheng Minqi et al., with the low silicon steel as a cathode plating member, an Fe—Si alloy layer is prepared on the cathode surface by electrolysis in the reducing atmosphere of SiCl4 and FeCl2 aqueous solution system, and Si on the surface of low silicon steel is added twice in combination with subsequent heat treatment. However, SiCl4 is toxic and corrosive, pollutes the environment, and also wastes iron resources. The product Si—Fe alloy layer adheres to the cathode surface, and it is difficult to control the thickness of final product. Therefore, it is urgent to develop a new practical production process of high-silicon steel.

SUMMARY OF THE DISCLOSURE

The object of the invention is to overcome the technical defects of the prior art and achieve green preparation of gradient high-silicon steel strips by the molten salt electrolysis technology with high-purity iron or low-silicon steel as a base material, so as to solve the problems of non-uniform diffusion of silicon and severe cold brittleness during preparing the prior high-silicon steel. In combination with subsequent heat treatment, the purpose of controlling the silicon concentration gradient can be achieved, and a gradient high-silicon steel plate strip with good plasticity and controllable size ranging can be obtained.

In order to achieve the purpose, the invention provides the following technical solutions.

The invention provides a method for preparing a high-silicon steel by molten salt electrolysis with high-purity iron or low-silicon steel as a base material under simple procedures and mild conditions, and specifically comprises the following steps:

(1) electrolyte preparation: weighing the inorganic fluoride salt and the inorganic silicon salt, mixing them uniformly and then drying; wherein the molar ratio of the inorganic silicon salt to the inorganic fluoride salt is not more than 1: 9, the inorganic silicon salt includes $Na_2SiF_6$, $K_2SiF_6$, $Li_2SiF_6$ or $SiO_2$;

(2) molten salt electrolysis: placing the electrolyte in an electrolysis container, then immersing a cathode and an anode into the electrolyte, heating the electrolysis container over the melting point of the electrolyte, introducing the inert gas into the electrolysis container, and connecting the electrode to the power supply to perform constant current electrolysis, after the electrolysis is finished, the cathode is taken out, washed and dried, wherein the cathode is low silicon steel or pure iron, and the anode is single crystal silicon or polycrystalline silicon, the current density during the electrolysis is 1-20 $mA/cm^2$ (3) high temperature annealing: placing the dried cathode in a constant temperature region of an annealing furnace; under a protective gas atmosphere, heating the cathode over the target temperature at the rate of 5-10° C./min, and maintaining the temperature for a period of time; after the heat treatment, cooling the cathode to the room temperature at the rate of 5-10° C./min ,during which the cathode is always placed in the furnace, and then the gradient high-silicon steel with a uniform silicon concentration difference from the outside to the inside is obtained, wherein the expression of the temperature maintaining time t/min, the target temperature, T'/° C., the thickness of the cathode, x/mm, the difference of the target silicon content in the center of the cathode and the initial silicon content of the cathode, $\Delta Si/\%$, and the silicon content gradient k is as follows:

$$t = \frac{106 \times 10^8 \times e^{\frac{-T'}{70}} \times x^{0.75} \times \Delta Si}{k^{1.05}}.$$

Further, the inorganic fluoride salt in the step (1) comprises at least one of LiF, NaF and KF and a binary or ternary salt thereof.

Further, both the inorganic fluoride salt and the inorganic silicon salt have a purity no less than 98%.

Further, the drying in the step (1) specifically comprises heating the electrolyte to 200° C. in a vacuum furnace and maintaining the temperature for 12 h.

Further, the components of the low silicon steel in the step (2) comprises 0 wt % ≤Si ≤4.5 wt %, Fe≥95 wt %, and the balance being unavoidable residual elements.

Further, the thickness of the cathode in the step (2) is 0.05 mm-1 mm.

Further, the purity of the anode in the step (2) is not less than 98%.

Further, the step (2) includes the step of washing the cathode and the anode and drying them at 70° C. to 80° C. before immersed in the electrolyte.

Further, in the step (2), the electrolysis container comprises a crucible and a vertical resistance furnace, and the step of placing the electrolyte in the electrolysis container specifically comprises: placing the electrolyte in a crucible, and then placing the crucible in the constant temperature region of the vertical resistance furnace.

Further, the crucible includes an iron crucible, a quartz crucible, a corundum crucible, a graphite crucible, or a nickel crucible.

Further, heating the electrolysis container in the step (2) specifically comprises heating the resistance furnace over the melting point of the electrolyte.

Further, the temperature over the melting point of the electrolyte in the step (2) is 550° C.-950° C.

Further, the inert gas in the step (2) is argon or nitrogen with a purity no less than 99%.

Further, the protective gas in the step (3) is argon or nitrogen with a purity no less than 99%.

Further, the target temperature in the step (3) is 1000° C.-1200° C.

Further, in the step (3), the expression of the silicon concentration gradient k, the difference between the target silicon content on the surface of the cathode and the target silicon content in the center of the cathode, ΔSi' %, and the thickness of the cathode, x/mm is:

$$k = \frac{\Delta Si'}{x/2}.$$

The present invention creatively proposes the use of single crystal/polycrystalline Si as an anode. The anode Si is dissolved during electrolysis and the cathode Si deposits on the surface of the substrate and then diffuses into the substrate, which can ensure a constant concentration of silicon ions in the molten salt and achieve green recycling of the molten salt. Diffusion control effects can be reduced effectively by using inorganic silicon salt including $Na_2SiF_6$, $K_2SiF_6$, $Li_2SiF_6$ or $SiO_2$ as the electrolytic molten salt material, which can be stable in F/Li/Na/K solvent to form stable fluoride complex, consequently, the increase of roughness, porosity and the formation of dendritic or powdery products on the high silicon steel surface can be avoided effectively.

The present invention creatively proposes that there is no Si deposition layer on the surface of the prepared high-silicon steel when the deposition and diffusion rates are equivalent, consequently the thickness of the cathode substrate is unchanged, the surface of the Si diffusion layer is smooth, the Si distribution in the diffusion layer is uniform, the concentration gradient is small, and the current efficiency is high. Based on the reaction system of the present invention, the Si' reduction rate is equal to the diffusion rate of Si in the substrate and the cathode reduction product diffuses into the substrate completely by controlling the current density at 1-20 mA/cm², which results in the diffusion of Si with high concentration into the substrate and the formation of high silicon steel.

The present invention creatively proposes that, based on the system of the present invention, when the molar concentration of silicon-containing ions in the electrolytic solution exceeds 10%, the roughness of the Si diffusion layer of the resulting product increases sharply which makes it hard to obtain a smooth surface. The Kendall effect is easily induced in the process of silicon-iron interdiffusion, which results in the formation of pore defects in the siliconized layer, due to that the diffusion coefficient of silicon is greater than that of iron, and the diffusion rate of silicon is much higher than that of iron under the condition of high concentration of silicon ion in the molten salt. In order to avoid the generation of defects, the concentration of silicon ion in the molten salt should be controlled effectively, which is preferentially 0.01-10% counting by molar.

The present invention creatively proposes that the solubility and diffusion rate of silicon ions are greatly influenced by the temperature. When the difference between the electrolysis temperature and the melting point of the molten salt is less than 60° C., the solubility and diffusion rates of the silicon ion electrolyte in the molten salt are too low, so that the deposition rate of silicon ions during electrolysis is much less than the diffusion rate of silicon in the substrate, which results in the generation of pores in the siliconized layer and increase of the brittleness of the silicon steel. Thus, the preferred electrolysis temperature is 550-900° C.

The present invention creatively proposes that the addition of a diffusion annealing step after electrolysis can further promote the diffusion of Si on the surface layer of the substrate into the interior. Based on the high-silicon steel substrate obtained under the above-mentioned electrolysis conditions, it is particularly critical to obtain a high-silicon steel sheet with a uniform gradient difference by controlling the temperature and temperature maintaining time during the annealing heat treatment. Studies show that when the annealing temperature exceeds 1250° C., the substrate appears to be partially melted, and the preparation of a gradient high-silicon steel cannot be completed. When the temperature is too low, for example, below 1000° C., the distribution of Si in the substrate cannot be graded due to the insufficient diffusion kinetics and thermodynamic conditions formed by the lower temperature. Based on this, the diffusion process parameters should be controlled as the annealing temperature is in the range of 1000-1200° C. In addition, according to a large number of experimental rules, it is found that the temperature maintaining time of annealing should be specifically related to the annealing temperature, the thickness of the cathode, and the concentration difference between the surface of the cathode and the center of the cathode in order to achieve a uniform graded distribution. On the basis of the system of the present invention, the expression of the temperature maintaining time t/min, the target temperature, T'/° C., the thickness of the cathode, x/mm, the difference of the target silicon content in the center of the cathode and the initial silicon content of the cathode, ΔSi/%, and the silicon content gradient k is as follows:

$$t = \frac{106 \times 10^8 \times e^{\frac{-T'}{70}} \times x^{0.75} \times \Delta Si}{k^{1.05}}.$$

The invention has the following outstanding characteristics and remarkable effects.

(1) The present invention directly uses a high-purity iron or low-silicon steel thin strip as a base material, avoids the problem of brittle cracking of high-silicon steel during rolling, and solves the problems of poor surface quality and small size specification.

(2) According to the present invention, by controlling the current density, electrolysis temperature, time and silicon ion concentration to prepare a substrate having a controllable Si permeation layer thickness and content, combined with a subsequent high temperature thermal diffusion process, a gradient silicon steel having a gradually decreasing Si content from the surface to the interior can be produced. According to the aspect of the present invention, it is possible to obtain a high-silicon steel having an edge Si content of 6% or more, an inner Si content of 3% or more, and a uniform gradient in the substrate.

(3) According to the gradient silicon steel prepared by the present invention with the Si content gradually decreasing from the surface to the inside (the difference between the actual silicon concentration gradient and the preset silicon concentration gradient is less than $1\ \%\phi mm^{-1}$), the magnetic permeability gradient thereof can make the magnetic flux gather on the surface, and the resistivity gradient can significantly reduce the strength of the surface eddy current and reduce the iron loss while giving full play to the magnetic properties of the high silicon layer. The gradient distribution of silicon concentration improves the brittleness of high-silicon steel substrate, and the elongation increases obviously. The application range of gradient silicon steel can be extended by adapting to the requirements of strength and toughness of iron core material under high frequency conditions.

(4) The anode of the present invention uses a Si rod to achieve anodic Si dissolution during electrolysis and cathodic Si deposition and diffusion at the same time, so that the concentration of silicon ions in the molten salt is constant and the molten salt can be recycled. The operation is simple, cost-effective and pollution-free, which can realize the continuous production of the whole process.

DETAILED DESCRIPTION OF THE DISCLOSURE

Example 1

30 g LiF with a purity of 99.5%, 68 g KF eutectic salt with a purity of 99.9% and 5.0 g $K_2SiF_6$ with a purity of 99.9% were weighed and mixed at 300 r/min for 1 h by a planetary high-energy ball mill. The iron crucible which was dried by wiping with alcohol before use, filled with the mixture was placed in a horizontal furnace, the temperature of the furnace filled with high-purity Ar was maintained at 200° C. for 12 h.

A single crystal Si rod with a diameter of 5 mm and a length of 50 mm was used as an anode, and a low-silicon steel sheet with a thickness of 0.3 mm was used as a cathode. The chemical composition of the low-silicon steel sheet, counting by mass percentage, were Si: 3.0%, C: 0.0022%, Als: 0.55%, Mn: 0.31%, O: 0.0060%, P: 0.011%, S: 0.0017%, N: 0.0019%, Ti: 0.0018%, V: 0.0014%, Nb: 0.0015%, B: 0.0049%, Sn: 0.105%, and the balance being Fe. The cathode silicon steel sheet was successively ground 2 min on 240-mesh, 500-mesh, 800-mesh and 1000-mesh sandpaper, and then polished on 1-3-mesh metallographic sandpaper. The dimensions of the silicon steel sheet were measured with a vernier caliper, and the surface area immersed in molten salt during electrolysis was calculated to be 2.08 cm² (calculated as 2 cm immersed). The electrode was successively washed with deionized water and absolute ethanol on the surface and then dried in a 70° C. oven for use.

The above-mentioned iron crucible filled with salt was horizontally placed in a constant temperature region of a vertical resistance furnace with crucible clamps. A low-silicon steel sheet cathode was fixed on one end of a stainless-steel rod with a 0.1 mm iron wire and was inserted into the middle of the furnace tube through a pipe orifice of an upper furnace cover of the resistance furnace. The Si rod anode was placed by the same process. After checking the resistance furnace installed with good air tightness, high-purity Ar gas and circulating water were introduced into the furnace, and then the furnace was heated to 600° C. at 5° C./min. After reaching the target temperature, the temperature was maintained for 15 min to completely melt the mixture.

Figure 1:
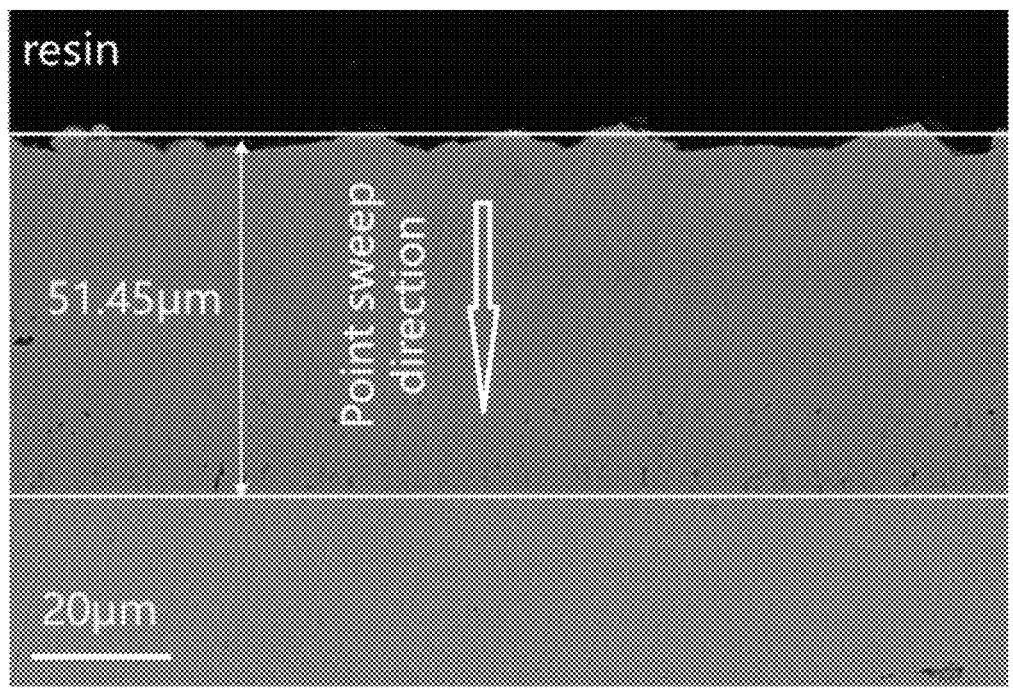
FIG. 1 is the scanning electron micrograph of the electrolytic product of Example 1.
Figure 2:
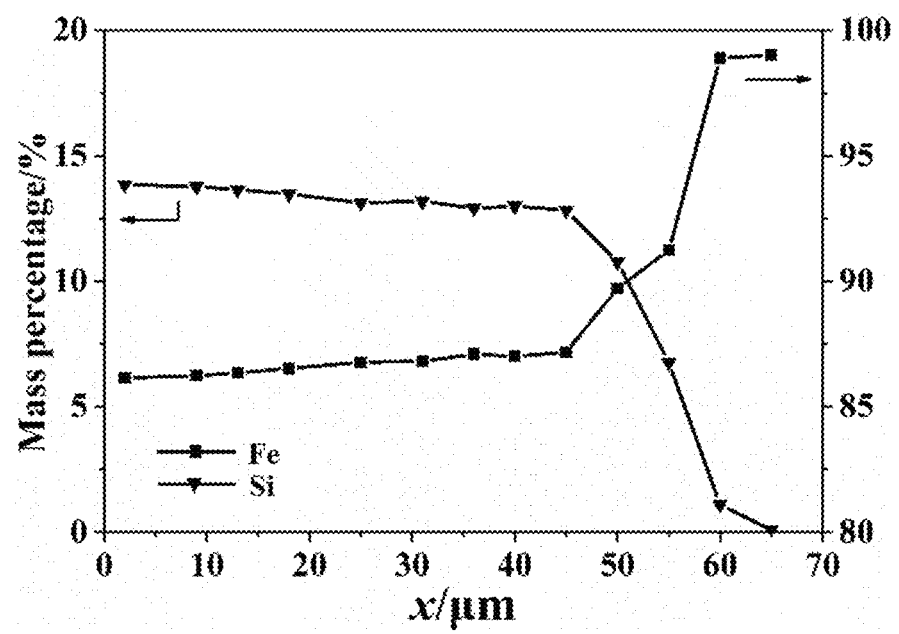
FIG. 2 is the graph showing the element content distribution from the surface to the interior of the diffusion layer of the electrolytic product of Example 1.

A multimeter was connected above the two electrodes, the position of molten salt and the depth of immersion of electrode into the molten salt was measured. The anode and cathode were both immersed into the molten salt for 2 cm. After fixing the electrode position, the electrode was connected to the power supply, with the constant current of 10.4 mA (5 mA/cm²) and the electrolysis was performed for 3 h. After electrolyzing, the electrode was slowly lifted 2 cm above the molten salt surface and cooled to room temperature at the rate of 5° C./min. The electrode sheet was taken out from the furnace, the residual molten salt on the surface of silicon steel sheet was wiped by cotton dipping deionized water. Then the deionized water on the surface was remove by alcohol. and then the silicon steel sheet was dried in a 70° C. oven. The scanning electron micrograph of the electrolytic product could be seen in FIG. 1, and the element content distribution diagram of the electrolytic product diffusion layer from the surface to the inside could be seen in FIG. 2.

The specific process of the diffusion annealing heat treatment is as follows.

Figure 3:
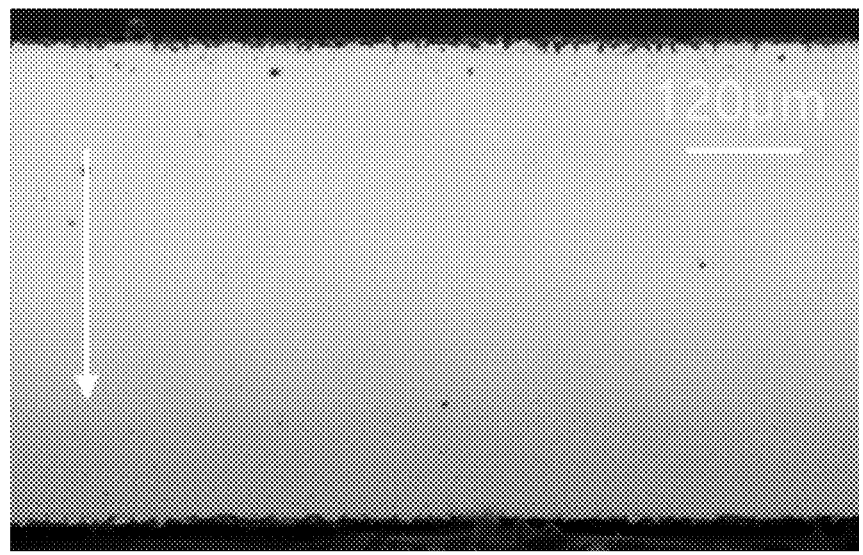
FIG. 3 is the scanning electron micrograph of the heat-treated product of Example 1.
Figure 4:
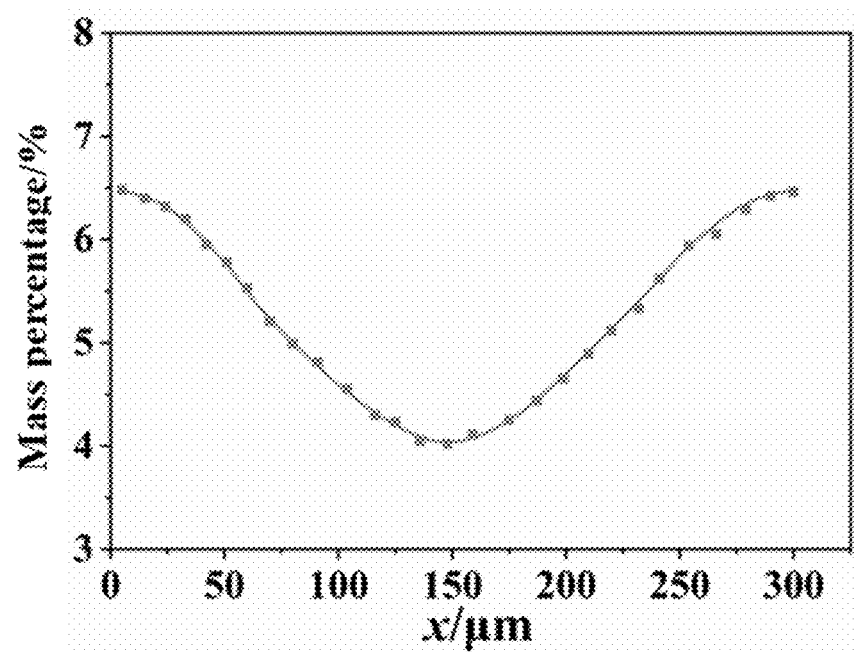
FIG. 4 is the graph showing the Si content distribution of the heat-treated product of Example 1.

The electrolytic product was placed in a constant temperature region of an annealing furnace, with carbon blocks placed at the mouth of the annealing furnace and the cover tightly closed. After checking that the gas tightness was good, the annealing furnace was cleaned with high-purity Ar gas for three times to remove residual oxygen in the furnace chamber, and finally high-purity Ar was introduced. The furnace was heated to 1150° C. at the rate of 5° C./min and the temperature maintaining time was set to 18 min according to the Si concentration gradient k of $16.0\%\cdot mm^{-1}$. After heating treatment, the sample is cooled to room temperature in the furnace at a rate of 5° C./min so as to obtain a high-silicon steel with a uniformly decreasing of Si content gradient. The scanning electron micrograph of the heat-treated product was shown in FIG. 3, and the Si content distribution of the heat-treated product was shown in FIG. 4. After determination, the Si content on the surface of the gradient high-silicon steel obtained in this example was 6.5%, the inside Si content was 4.1%, and the Si content decreased uniformly in a gradient from the surface to the inside of high-silicon steel. The concentration gradient was 16.0%·mm$^{-1}$, with the difference from the presetting gradient value being within 1%, and satisfying the expected requirements. Iron loss $P_{10/50}$=0.65 W·kg$^{-1}$, $P_{10/400}$=8.7 W·kg$^{-1}$, tensile strength was 680 MPa, elongation was 7.5%. The surface of the sample was smooth, without dendrites. No defects such as pores were observed. The density of the product was high.

Example 2

This example was prepared by the same process of Example 1, except that the electrolysis current was set to 6.28 mA (3 mA/cm$^2$) and the electrolysis was performed for 4 h. The temperature maintaining time of the heat treatment was set to 8 min according to the Si concentration gradient k of 16.0%·mm$^{-1}$.

After determination, the Si content on the surface of the gradient high-silicon steel obtained in this example was 6.0%, the inside Si content was 3.5%, and the Si content decreased uniformly in a gradient from the surface to the inside of high-silicon steel. The concentration gradient was 16.6%·mm$^{-1}$, with the difference from the presetting gradient value being within 1%, and satisfying the expected requirements. Iron loss $P_{10/50}$=0.77 W·kg$^{-1}$, $P_{10/400}$=9.1 W·kg$^{-1}$, tensile strength was 630 MPa, elongation was 8.5%. The surface of the sample was smooth, without dendrites. No defects such as pores were observed. The density of the product was high.

Example 3

This example was prepared by the same process of Example 1, except that the chemical composition of low-silicon steel sheet, counting by mass percentage, are Si: 2.5%, C: 0.0022%, Als: 0.55%, Mn: 0.31%, O: 0.0060%, P: 0.011%, S: 0.0017%, N: 0.0019%, Ti: 0.0018%, V: 0.0014%, Nb: 0.0015%, B: 0.0049%, Sn: 0.105%, and the balance being Fe. The electrolysis current was set to 4.16mA (2mA/cm$^2$) and the electrolysis was performed for 6 h. The temperature maintaining time of the heat treatment was set to 20 min according to the Si concentration gradient k of 13.0%·mm$^{-1}$ t.

After determination, the Si content on the surface of the gradient high-silicon steel obtained in this example was 5.5%, the inside Si content was 3.5%, and the Si content decreased uniformly in a gradient from the surface to the inside of high-silicon steel. The concentration gradient was 13.4% mm$^{-1}$, with the difference from the presetting gradient value being within 1%, and satisfying the expected requirements. Iron loss $P_{10/50}$=0.81 W·kg$^{-1}$, $P_{10/400}$=9.9 W·kg$^{-1}$, tensile strength was 610 MPa, elongation was 10.1%. The surface of the sample was smooth, without dendrites. No defects such as pores were observed. The density of the product was high.

Example 4

This example was prepared by the same process of Example 1, except that the electrolysis current was set to 20.8 mA (10 mA/cm$^2$) and the electrolysis was performed for 2 h. The temperature maintaining time of the heat treatment was set to 16 min according to the Si concentration gradient k of 17.0%·mm$^{-1}$.

After determination, the Si content on the surface of the gradient high-silicon steel obtained in this example was 6.5%, the inside Si content was 4.0%, and the Si content decreased uniformly in a gradient from the surface to the inside of high-silicon steel. The concentration gradient was 16.6%·mm$^{-1}$, with the difference from the presetting gradient value being within 1%, and satisfying the expected requirements. Iron loss $P_{10/50}$=0.66 W·kg$^{-1}$, $P_{10/400}$=8.7 W·kg$^{-1}$, tensile strength was 670 MPa, elongation was 7.5%. The surface of the sample was smooth, without dendrites. No defects such as pores were observed. The density of the product was high.

Example 5

This example was prepared by the same process of Example 1, except that the mass weight and the purity of $K_2SiF_6$ were 2.6 g (0.5 mol %), and 99.9% respectively, and the electrolysis was performed for 6 h. The temperature maintaining time of the heat treatment was set to 17 min according to the Si concentration gradient k of 16.0%·mm$^{-1}$.

After determination, the Si content on the surface of the gradient high-silicon steel obtained in this example was 6.3%, the inside Si content was 4.0%, and the Si content decreased uniformly in a gradient from the surface to the inside of high-silicon steel. The concentration gradient was 15.3%·mm$^{-1}$, with the difference from the presetting gradient value being within 1%, and satisfying the expected requirements. Iron loss $P_{10-50}$=0.65 W·kg$^{-1}$, $P_{10-400}$=8.9 W·kg$^{-1}$, tensile strength was 680 MPa, elongation was 7.7%. The surface of the sample was smooth, without dendrites. No defects such as pores were observed. The density of the product was high.

Example 6

This example was prepared by the same process of Example 1, except that the cathode was a pure iron sheet with a thickness of 0.3 mm, and the electrolysis was performed for 6 h. The temperature maintaining time of the heat treatment was set to 56 min according to the Si concentration gradient k of 17.0%·mm$^{-1}$.

After determination, the Si content on the surface of the gradient high-silicon steel obtained in this example was 6.0%, the inside Si content was 3.6%, and the Si content decreased uniformly in a gradient from the surface to the inside of high-silicon steel. The concentration gradient was 16.1%·mm$^{-1}$, with the difference from the presetting gradient value being within 1%, and satisfying the expected requirements. Iron loss $P_{10/50}$=0.79 W·kg$^{-1}$, $P_{10/400}$=9.2 W·kg$^{-1}$, tensile strength was 620 MPa, elongation was 8.6%. The surface of the sample was smooth, without dendrites. No defects such as pores were observed. The density of the product was high.

Example 7

This example was prepared by the same process of Example 1, except that the electrolysis temperature was set to 700° C. and current was to 6.28 mA (3 mA/cm$^2$). The temperature maintaining time of the heat treatment was set to 17 min according to the Si concentration gradient k of 16.0%·mm$^{-1}$.

After determination, the Si content on the surface of the gradient high-silicon steel obtained in this example was 6.4%, the inside Si content was 4.0%, and the Si content decreased uniformly in a gradient from the surface to the inside of high-silicon steel. The concentration gradient was 16.0%·mm$^{-1}$, with the difference from the presetting gradient value being within 1%, and satisfying the expected requirements. Iron loss $P_{10/500}$=0.68 W·kg$^{-1}$, $P_{10/400}$=8.8 W·kg$^{-1}$, tensile strength was 660 MPa, elongation was 7.9%. The surface of the sample was smooth, without dendrites. No defects such as pores were observed. The density of the product was high.

Example 8

This example was prepared by the same process of Example 1, except that during the diffusion annealing heat treatment, the furnace was heated to 1000° C. and the temperature maintaining time was set to 35 min according to the Si concentration gradient k of 16.0%·mm$^{-1}$.

After determination, the Si content on the surface of the gradient high-silicon steel obtained in this example was 6.5%, the inside Si content was 4.0%, and the Si content decreased uniformly in a gradient from the surface to the inside of high-silicon steel. The concentration gradient was 16.7%·mm$^{-1}$, with the difference from the presetting gradient value being within 1%, and satisfying the expected requirements. Iron loss $P_{10/500}$=0.68 W·kg$^{-1}$, $P_{10/400}$=8.8 W·kg$^{-1}$, tensile strength was 680 MPa, elongation was 7.6%. The surface of the sample was smooth, without dendrites. No defects such as pores were observed. The density of the product was high.

Comparative Example 1

This comparative example was prepared by the same process of Example 1, except that the electrolysis was performed for 6 h and the temperature maintaining time of the heat treatment was set to 30 min.

After determination, the Si content on the surface and in the inside of the high-silicon steel obtained in this example were both 6.5%, with the uniform distribution of the Si in the substrate. Iron loss $P_{10/50}$=0.65 W·kg$^{-1}$, $P_{10/400}$=8.6 W·kg$^{-1}$, tensile strength was 720 MPa, elongation was 1.6%. The surface of the sample was smooth, without dendrites. No defects such as pores were observed. The density of the product was high. The brittleness was significantly higher and the ductility was poorer compared with the examples.

Comparative Example 2

This comparative example was prepared by the same process of Example 1, except that the electrolysis current was set to 52.0 mA (25 mA/cm$^2$) and the electrolysis was performed for 2 h. The temperature maintaining time of the heat treatment was set to 14 min according to the Si concentration gradient k of 30.0%·mm$^{-1}$.

After determination, the Si content on the surface of the gradient high-silicon steel obtained in this example was 9.0%, the inside Si content was 4.5%, and the Si content decreased uniformly in a gradient from the surface to the inside of high-silicon steel. The concentration gradient was 30.0%·mm$^{-1}$, with the difference from the presetting gradient value being within 1% and satisfying the expected requirements. Iron loss $P_{10/50}$=1.09 W·kg$^{-1}$, $P_{10/400}$=13.1 W·kg$^{-1}$, tensile strength was 750 MPa, elongation was 0.8%. The surface of the sample was smooth, without dendrites. No defects such as pores were observed. The density of the product was high. the deposition rate of silicon was much higher than the diffusion rate of silicon into the substrate, due to the much high electrolysis current density, and the crystallization tended to grow along the electric field to the inside of the electrolyte, which caused the surface of the deposition layer to nodulation and the formation of dendritic crystals. The sample was brittle and poor in ductility. Dendritic formation was observed on the surface of the sample, and tens of micron-sized pores were observed, resulting in poor density.

Comparative Example 3

This comparative example was prepared by the same process of Example 1, except that the weight of the $K_2SiF_6$ with a purity of 99.9% was 0 g(0 mol).The temperature maintaining time of the heat treatment was set to 5 min according to the Si concentration gradient k of 15.0%·mm$^{-1}$.

After determination, the Si content on the surface of the gradient high-silicon steel obtained in this example was 5.5%, the inside Si content was 3.3%, and the Si content decreased in a gradient from the surface to the inside of high-silicon steel. The concentration gradient was 14.6%·mm$^{-1}$, with the difference from the presetting gradient value being within 1% and satisfying the expected requirements. Iron loss $P_{10/50}$=1.25 W·kg$^{-1}$, $P_{10/400}$=17.8 W·kg$^{-1}$, tensile strength was 690 MPa, elongation was 2.7%. The absence of Si ion in molten salt before electrolyzing resulted in non-silicon deposition at the early stage of electrolysis, which resulted in the deposition of impurities in the molten salt onto the surface of the cathode. Thus, the dendritic formation and tens of micron-sized pores which leaded to low density were observed on the surface of the sample with high brittleness and low ductility.

Comparative Example 4

This comparative example was prepared by the same process of Example 1, except that the electrolysis temperature was set to 520° C. The temperature maintaining time of the heat treatment was set to 17 min according to the Si concentration gradient k of 11.0%mm$^{-1}$.

After determination, the Si content on the surface of the gradient high-silicon steel obtained in this example was 5.1%, the inside Si content was 3.6%, and the Si content decreased in a gradient from the surface to the inside of high-silicon steel. The concentration gradient was 10%·mm$^{-1}$, with the difference from the presetting gradient value being within 1% and satisfying the expected requirements. Iron loss $P_{10/50}$=1.15 W·kg$^{-1}$, $P_{10/400}$=18.6 W·kg$^{-1}$, tensile strength was 660 MPa, elongation was 3.3%. The low electrolysis current resulted in the high brittleness and low ductility of the sample, the dendritic formation and tens of micron-sized pores which leaded to low density were observed on the surface of the sample.

Comparative Example 5

This comparative example was prepared by the same process of Example 1, except that the furnace was heated to 900° C. during the diffusion annealing heat treatment and the temperature maintaining time of the heat treatment was set to 60 min.

After determination, the Si content on the surface of the gradient high-silicon steel obtained in this example was 7.8%, the inside Si content was 3.5%, and the Si content decreased in a gradient from the surface to the inside of high-silicon steel. The concentration gradient was 28.67%·mm$^{-1}$. Iron loss $P_{10/50}$=0.88 W·kg$^{-1}$, $P_{10/400}$=9.8 W·kg$^{-1}$, tensile strength was 720 MPa, elongation was 3.0%. The sample had high brittleness and poor ductility. The silicon concentration difference between the surface and inside of the high-silicon steel was more than 4% and the concentration gradient was large. The application of gradient silicon steel at this concentration difference was not reported at present.

Comparative Example 6

This comparative example was prepared by the same process of Example 1, except that the temperature maintaining time of the heat treatment was set to 30 min.

After determination, the Si content on the surface of the gradient high-silicon steel obtained in this example was 5.7%, the inside Si content was 4.7%, and the Si content decreased uniformly in a gradient from the surface to the inside of high-silicon steel. The concentration gradient was only 7.2%·mm$^{-1}$. Iron loss $P_{10/50}$=1.13 W·kg$^{-1}$, $P_{10/400}$=12.8 W·kg$^{-1}$, tensile strength was 640 MPa, elongation was 1.9%. The lower concentration gradient of Si, the more brittle of the sample and the higher loss of the iron.

Comparative Example 7

This comparative example was prepared by the same process of Example 1, except that the temperature maintaining time of the heat treatment was 10 min.

After determination, the Si content on the surface of the gradient high-silicon steel obtained in this example was 7.1%, the inside Si content was 3.5%, and the Si content decreased uniformly in a gradient from the surface to the inside of high-silicon steel. The concentration gradient was 24%·mm$^{-1}$, which was much high level. Iron loss $P_{10/50}$=1.06 W·kg$^{-1}$, $P_{10/400}$=12.9 W·kg$^{-1}$, tensile strength was 670 MPa, elongation was 2.6%.

Comparative Example 8

This comparative example was prepared by the same process of Example 1, except that $K_2SiCl_6$ was replaced with $K_2SiF_6$. The temperature maintaining time of the heat treatment was set to 5 min according to the Si concentration gradient k of 15.0%·mm$^{-1}$.

After determination, the Si content on the surface of the gradient high-silicon steel obtained in this example was 5.5%, the inside Si content was 3.3%, and the Si content decreased in a gradient from the surface to the inside of high-silicon steel. The concentration gradient was 14.6%·mm$^{-1}$, with the difference from the presetting gradient value being within 1% and satisfying the expected requirements. Iron loss $P_{10/50}$=1.25 W·kg$^{-1}$, $P_{10/400}$=22.8 W·kg$^{-1}$, tensile strength was 690 MPa, elongation was 2.5%. Compare with Example 3, Stable Si ion was not formed in the molten salt before electrolyzing resulted in non-silicon deposition at the early stage of electrolysis, which resulted in the deposition of impurities in the molten salt onto the surface of the cathode. Thus, the dendritic formation and tens of micron-sized pores which leaded to low density were observed on the surface of the sample with high brittleness and low ductility.

The embodiments described above are only preferred embodiments of the present invention and are not intended to limit the present invention. It is within the scope of the present invention for those skilled in the art to make equivalent substitutions and alterations on the basis of the present invention.

What is claimed is:

1. A preparation method of gradient high-silicon steel by molten salt electrolysis, characterized in that it comprises the following steps:
   (1) electrolyte preparation: weighing the inorganic fluoride salt and the inorganic silicon salt, mixing them uniformly and then drying; wherein the molar ratio of the inorganic silicon salt to the inorganic fluoride salt is not more than 1:9, the inorganic silicon salt includes $Na_2SiF_6$, $K_2SiF_6$, $Li_2SiF_6$ or $SiO_2$;
   (2) molten salt electrolysis: placing the electrolyte in an electrolysis container, then immersing a cathode and an anode into the electrolyte, heating the electrolysis container to 550° C.-950° C., passing the inert gas through the electrolysis container, and connecting the electrode to the power supply to perform constant current electrolysis, after the electrolysis is finished, the cathode is taken out, washed and dried, wherein the cathode is low silicon steel or pure iron, and the anode is single crystal silicon or polycrystalline silicon, the current density during the electrolysis is 1-20 mA/cm$^2$, and the thickness of the cathode is 0.05 mm-1 mm;
   (3) high temperature annealing: placing the dried cathode in a constant temperature region of an annealing furnace; under a protective gas atmosphere, heating the cathode to the target temperature which is 1000-1200° C. at the rate of 5-10° C./min, and maintaining the temperature for a period of time; after the heat treatment, cooling the cathode to the room temperature at the rate of 5-10° C./min ,during which the cathode is always placed in the furnace, and then the gradient high-silicon steel with a uniform silicon concentration difference from the outside to the inside is obtained, wherein the expression of the temperature maintaining time t/min, the target temperature , T′/° C., the thickness of the cathode , x/mm, the difference of the target silicon content in the center of the cathode and the initial silicon content of the cathode, ΔSi/%, and the silicon content gradient k is as follows:

$$t = \frac{106 \times 10^8 \times e^{\frac{-T'}{70}} \times x^{0.75} \times \Delta Si}{k^{1.05}},$$

the expression of the silicon concentration gradient k, the difference between the target silicon content on the surface of the cathode and the target silicon content in the center of the cathode, ΔSt%, and the thickness of the cathode, x/mm is:

$$k = \frac{\Delta Si'}{x/2};$$

wherein, the target silicon content on the surface of the cathode is not less than 6% and the target silicon content in the center of the cathode is not less than 3%.

2. The preparation method according to claim 1, characterized in that the inorganic fluoride salt in the step (1) comprises at least one of LiF, NaF and KF.

3. The preparation method according to claim 1, characterized in that both the inorganic fluoride salt and the inorganic silicon salt have a purity no less than 98%.

4. The preparation method according to claim 1, characterized in that the drying in the step (1) specifically comprises heating the mixture of the inorganic fluoride salt and the inorganic silicon salt to 200-300° C. in a vacuum furnace and maintaining the temperature for 12 h or more.

5. The preparation method according to claim 1, characterized in that the components of the low silicon steel in the step (2) comprises 0 wt %$\leq$Si$\leq$4.5 wt %, Fe$\geq$95 wt %, and the balance being unavoidable residual elements.

6. The preparation method according to claim 1, characterized in that the purity of the anode in the step (2) is not less than 98%.

7. The preparation method according to claim 1, characterized in that the inert gas in the step (2) is argon or nitrogen with a purity no less than 99%; and the protective gas in the step (3) is argon or nitrogen with a purity no less than 99%.

* * * * *